(12) United States Patent
Medvinsky et al.

(10) Patent No.: US 8,321,663 B2
(45) Date of Patent: Nov. 27, 2012

(54) ENHANCED AUTHORIZATION PROCESS USING DIGITAL SIGNATURES

(75) Inventors: Alexander Medvinsky, San Diego, CA (US); Tat Keung Chan, San Diego, CA (US); Eric J. Sprunk, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 338 days.

(21) Appl. No.: 12/650,943

(22) Filed: Dec. 31, 2009

(65) Prior Publication Data

US 2011/0161661 A1    Jun. 30, 2011

(51) Int. Cl.
*H04L 9/00* (2006.01)
(52) U.S. Cl. ......... 713/156; 713/168; 713/173; 380/277
(58) Field of Classification Search .......... 713/168–171, 713/173, 156, 175–176; 380/277, 282, 285; 726/2–5, 10
See application file for complete search history.

(56) References Cited

U.S. PATENT DOCUMENTS

| | | |
|---|---|---|
| 2008/0016357 A1 | 1/2008 | Suarez |
| 2008/0028209 A1 | 1/2008 | Dare et al. |
| 2008/0086634 A1* | 4/2008 | Salowey et al. ............... 713/156 |
| 2008/0148044 A1 | 6/2008 | Upp et al. |
| 2009/0019280 A1 | 1/2009 | Blaikie et al. |
| 2009/0043891 A1 | 2/2009 | Woo et al. |
| 2009/0222902 A1 | 9/2009 | Bender et al. |
| 2009/0235070 A1 | 9/2009 | Trench |
| 2009/0249437 A1 | 10/2009 | Premec |
| 2009/0259842 A1 | 10/2009 | Kumagai et al. |
| 2009/0265548 A1 | 10/2009 | Gentry et al. |

* cited by examiner

*Primary Examiner* — Hosuk Song
(74) *Attorney, Agent, or Firm* — Susan R. Payne

(57) ABSTRACT

A method is provided for enhancing security of a communication session between first and second endpoints which employs a key management protocol. The method includes sending a first message to a first end point over a communications network requesting a secure communication session therewith. The message includes an identity of a second end point requesting the authenticated communication session. A digital certificate is received from the first endpoint over the communications network. The digital certificate is issued by a certifying source verifying information contained in the digital certificate. The digital certificate includes a plurality of fields, one or more of which are transformed in accordance with a transformation algorithm. A reverse transform is applied to the one or more transformed fields to obtain the one or more fields. The digital certificate is validated and a second message is sent to the first endpoint indicating that validation is complete.

22 Claims, 6 Drawing Sheets

ENHANCED AUTHORIZATION PROCESS USING DIGITAL SIGNATURES

BACKGROUND

The IEEE 802.16 standard (herein referred to as WiMAX) communication standard, among other packet data communication systems, can provide security features to prevent unauthorized users from accessing data on the network. These security features not only provide a measure of privacy for a user of the network, but also allows a service provider to establish some measure of control over access to its network.

One common technique to provide these security features is to use a Public Key Infrastructure (PKI) to provide authentication and privacy of messaging on the network. For example, access terminals and authentication servers within the service network utilize the asymmetric properties of public key cryptography to authenticate the end points of the communication link to prove to each other that at least one end point in the communication path has possession of a private key which is cryptographically associated with a public key that can be shared with the remote party. Typically a digital certificate is utilized by one or both of the end points of the communication link that contains an immutable set of attributes including the identity of the end point itself, the public key of the end point, and a signature from a certificate authority. Utilizing well known PKI based techniques, the end point(s) can validate that a digital certificate is signed by a trusted certificate authority and that the remote party has possession of the private key, the implication of which is that the identity of the remote party has been cryptographically validated.

Network service providers sometimes employ a standard authentication protocol framework, such as the Extensible Authentication Protocol (EAP), defined in RFC 3748, as a carrier protocol of the authentication mechanism. The EAP defines an authentication framework while security or privacy is achieved by using a key management protocol. The EAP protocol is highly versatile and easily expandable, and may carry various authentication mechanisms to conduct the authentication exchange. These may be referred to as EAP-specific authentication methods or mechanisms. Examples include EAP-TLS, EAP-SIM, EAP-AKA, PEAP, LEAP and EAP-TTLS. At the same time, it does not limit underlying carrier mechanisms, which could be link layer paths, e.g. Ethernet, WiFi (Wireless fidelity), WiMAX (World Interoperability for Microwave Access), as well as higher-layer paths such as IP, UDP (User Datagram Protocol) and RADIUS (Remote authentication Dial-In User Service).

Authentication frameworks often employ digital certificates and may include a certification policy, which defines the particular practices and procedures by which the digital certificates are used. Various standards have been developed for digital certificates, one of the most popular being the X.509 standard.

SUMMARY

In accordance with the present invention, a method is provided for enhancing security of a communication session between first and second endpoints which employs a key management protocol. The method includes sending a first message to a first end point over a communications network requesting a secure communication session therewith. The message includes an identity of a second end point requesting the authenticated communication session. A digital certificate is received from the first endpoint over the communications network. The digital certificate is issued by a certifying source verifying information contained in the digital certificate. The digital certificate includes a plurality of fields, one or more of which are transformed in accordance with a transformation algorithm. A reverse transform is applied to the one or more transformed fields to obtain the one or more fields. The digital certificate is validated and a second message is sent to the first endpoint indicating that validation is complete.

In accordance with another aspect of the invention, a method is provided for gaining access to a communications network. The method includes sending a first message to an access point in the communications network requesting access to network services. The message includes an identity of a client device requesting access. The method also includes receiving from the access point a digital certificate from a H-AAA server associated with the communications network. The digital certificate includes a plurality of fields, one or more of which are transformed in accordance with a transformation algorithm. A reverse transformation is applied to the one or more transformed fields and the H-AAA server certificate is validated. A second message is sent to the access point indicating that validation is complete.

DETAILED DESCRIPTION

Typically, when a network access protocol employing a PKI is being developed by a standards body (e.g., the International Engineering Task Force (IETF) in the case of WiMAX), the security mechanism (i.e., the key management protocol) is often developed and accepted by a standards body well before the certificate profiles are specified.

A secure protocol standard may sometimes introduce the use of proprietary and/or confidential algorithms that can only be obtained under a license from a trusted authority. The use of such an algorithm may strengthen the security offered by the protocol since it is disclosed only to authorized parties that have signed agreements that include obligations to maintain the confidentiality of the algorithm as well as to protect private keys and other cryptographic information inside any device that implements the algorithm. Generally, when an unauthorized party implements a device that utilizes this standard, the security of such a device is in question. However, under such circumstances the unauthorized party may be using the algorithm unlawfully and thus may be subject to legal recourse.

If the proprietary and/or confidential algorithm is introduced after the key management protocol has already been standardized, it may be impractical to modify the key management protocol at that time since this would require a change to the already agreed-upon standard, which would involve a time-consuming and difficult process. However, if the certificate profile has not yet been standardized, it may be possible to introduce the proprietary and/or confidential algorithm into the process used to generate the one or more certificate fields, such as by encrypting the subject name attributes or the certificate signature. In this way the recipient must implement the proprietary and/or confidential algorithm in order to validate the authenticity of the sender.

Figure 1:
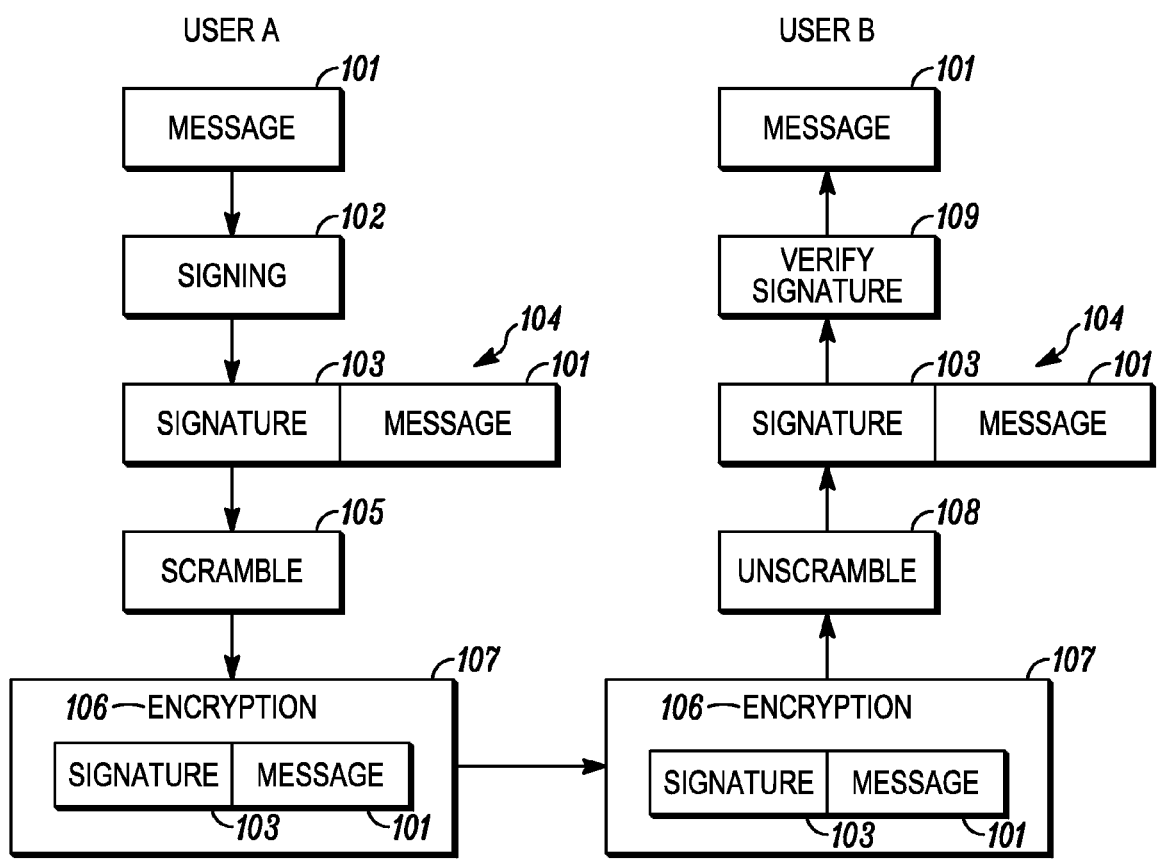
FIG. 1 shows an example of a key management protocol that employs a PKI and digital certificates to perform an authentication process.

FIG. 1 shows an example of a key management protocol that employs a PKI and digital certificates to perform the authentication process. PKI uses public key pairs to sign and scramble a message. In this example user A wishes to send a message 101 to user B. User A signs 102 the message 101 by using A's private key. This encryption enables the recipient to verify that the message 101 has come from user A, who is the only user to know user A's private key. This results in a set of data 104 formed by encrypting the digest of the original message 101 into a signature 103 which is then typically appended to the message 101. The manner in which the signature is formed by user A and verified by user B is discussed in more detail below in connection with FIG. 2.

In some implementations, the set of data 104 may then be scrambled 105 in order to keep the message secure or confidential. This scrambling 105 is carried out by user A encrypting the set of data 104 with user B's public key. This ensures that only user B will be able to unscramble the set of data 104. This results in a set of data 106 formed of an encryption 107 of the message 101 which includes the signature 103. The set of data 106 is transmitted to user B. Alternatively, in some cases at least a part of the set of data 104 is first encrypted and then the entire set of data 104 is digitally signed, after which the signature is attached to form the complete set of data 106.

User B carries out the reverse process. User B unscrambles 108 the set of data 106 by decrypting the data 106 using user B's private key. User B then has the set of data 104 in the form of the signature 103 and the message 101. User B can verify that the message 101 came from user A by decrypting the set of data 104 using user A's public key. User B then has the message 101, which only user B could have unscrambled with the reassurance that the message 101 did come from user A.

Figure 2:
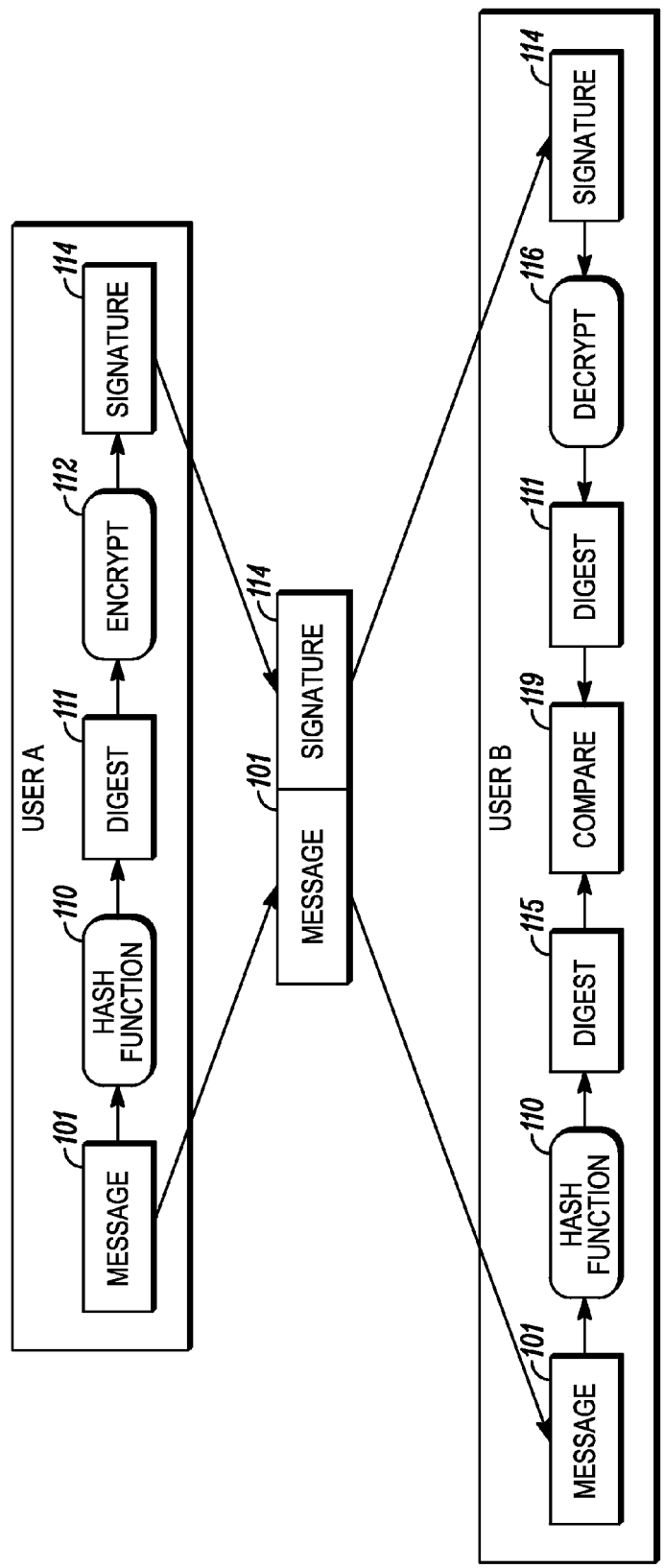
FIG. 2 illustrates the manner in which the signature is formed by user A and verified by user B.

FIG. 2 illustrates the method of signing a message in a PKI-based protocol such as shown in FIG. 1, where it is used to form the set of data 104. User A wishes to send a message 101 to user B. User A uses a hash function 110 to obtain a digest 111 of the message 101. The digest 111 is then encrypted 112 using user A's private key to obtain a signature 114. User A sends the message 101 and the signature 114 to user B.

User B applies the same hash function 110 to the message 101 it has received to obtain a digest 115. User B also decrypts 116 the signature 114 it has received using user A's public key. The decrypted signature is the digest 111 made by user A. The digest 111 obtained by decrypting the signature is compared 119 to the digest 115 made by the recipient. If the two digests are the same, the message 101 has been verified by the signature.

To verify that a public key is in fact the public key of a given user, a digital certificate may be employed. The digital certificate secures digital information within it by means of a digital signature using the certifying source's private key. In the case where a digital signature is being applied to a digital certificate, a particular choice of the hash function 110 is normally defined in the certificate profile. One of the most widespread digital certificate standards is X.509.

Figure 3:
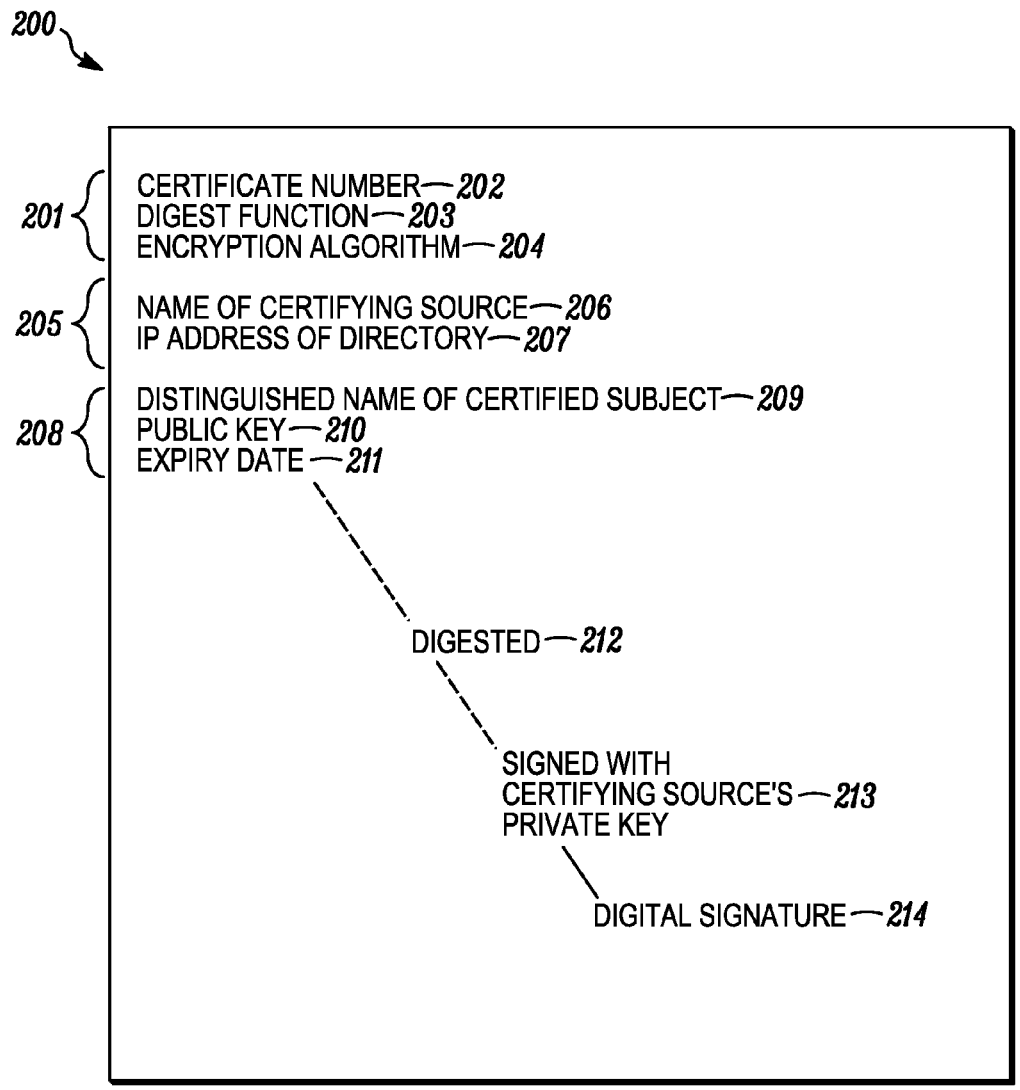
FIG. 3 illustrates an example format for a digital certificate.

FIG. 3 illustrates an example format for a digital certificate 200. The digital certificate 200 includes technical information 201 that may include a certificate serial number 202, the function 203 used to digest the signature, the signature encryption algorithm 204 used, etc. The digital certificate 200 also includes information 205 regarding the certifying source issuing the digital certificate 200. For example, the certifying source may be a Certificate Authority (CA). The information 205 may also include the name of the certifying source 206, an IP address 207 of the directory held by the certifying source, etc.

The digital certificate 200 also includes subject information 208 for the entity whose public key is being certified. The subject information 208 may include a distinguished name 209 of the subject for identifying the entity, the entity's public key 210, an expiration date of the public key 211, and any other information that may be necessary. The distinguished name is itself composed of several attribute fields including the common name, country of origin, and organization fields such as an organization name and an organization unit name. The information 201, 205, 208 is digested 212 and signed 213 by the certifying source using the certifying source's private key resulting in a digital signature 214.

As previously mentioned, it may sometimes be desirable to strengthen the security of a PKI-based protocol during the process of developing a standard for a security protocol. If the need for this additional security arises after the key management protocol is standardized, but before the certificate profile is standardized, it may be possible to transform the data in one or more fields of the digital certificate with a proprietary and/or confidential algorithm so that the recipient must implement this algorithm in order to validate the digital certificate.

In one example, the additional algorithm may be a hash of the entire digital certificate (with the exception of the digital signature field). While this may be a workable approach in some circumstances, it would make the format of the digital certificate incompatible with various standards such as X.509, which may be unacceptable to some standards body. This same problem arises if a field in the digital certificate having a well-defined use is encrypted or otherwise transformed. However, some fields in the digital certificate are either optional or do not have a well-defined usage. That is, they are not fully specified fields. Accordingly, it is possible to transform one or more of these fields while remaining in conformance with the digital certificate standard. Such optional or not fully specified fields include, for instance, some of the fields or attributes in the distinguished name, such as the common name, the organization name and the organization unit name.

The algorithm that is used to transform the one or more fields of the digital certificate may be chosen in any appropriate manner. Some examples of such an algorithm are symmetric or public key-based encryption, a keyed MAC (Message Authentication Code) or a cryptographic digest function. The transformation function may or may not require a cryptographic key. For those transformation functions that require a cryptographic key, the key may be a hardcoded value or it may be some other part or function of the certificate.

In some cases it may be desirable to use a proprietary (e.g., patented) algorithm. In this way additional enforcement mechanisms may be available to assert against those who are not authorized to practice the standard. For instance, if the algorithm is a patented algorithm, then a cause of action for patent infringement may be asserted against unauthorized parties such as the device manufacturer that created a non-certified device which implements the standard.

One example of a network to which the aforementioned security protocol may be employed for the purpose of secure network access is an IEEE 802.16 wireless network, which is sometimes referred to as a WiMAX network. However, the security protocol may be employed in other networks, both wired and wireless. Of course, the security protocol may be used for a purpose other than network access (for example for secure delivery of digital video).

Figure 4:
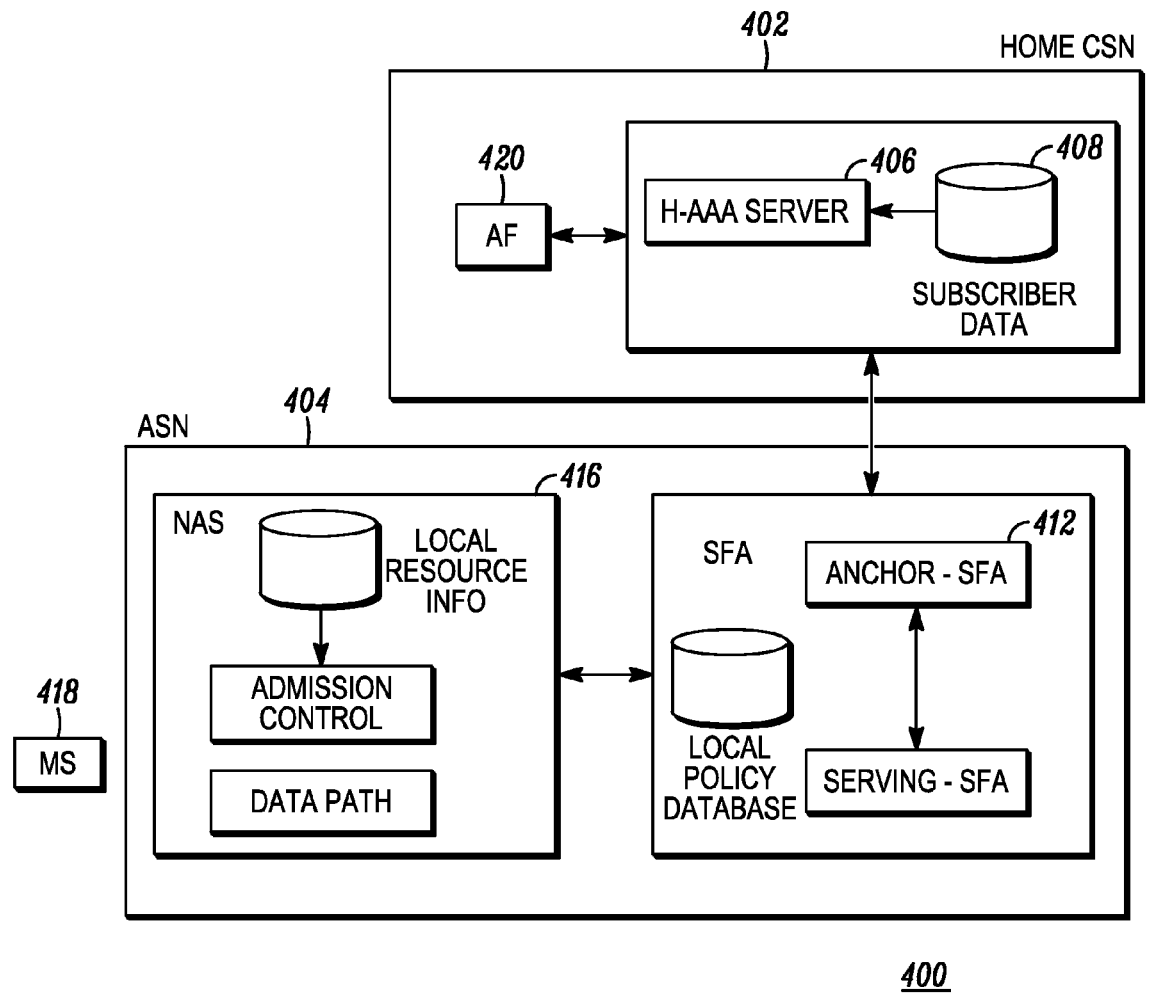
FIG. 4 shows one example of a WiMAX network.

FIG. 4 shows one example of a WiMAX network 400. The network 400 includes a CSN (WiMAX Connectivity Serving Network) 402, which is comparable to a core network, and an ASN (WiMAX Access Serving Network) 404, which has the role of a wireless access network. ASN 404 and CSN 402 may or may not be operated by different business entities (operators). The home CSN 402 of a WiMAX subscriber contains an H-AAA (Home Authentication, Authorization, Accounting) server 406, which holds subscriber subscription information 108 and the corresponding QoS profiles. The H-AAA server 406 is also responsible for authorizing the services for the subscriber.

When a MS (WiMAX Mobile Station) 418 attaches to the WiMAX network 400, the ASN 404 performs authentication of the subscriber with the subscriber's home CSN 402. After the MS 418 is successfully authenticated, an anchor SFA (Service Flow Authorization) device 412 registers itself with the H-AAA server 406 in the CSN 402. At this point the H-AAA server 406 will setup the pre-provisioned service flows by sending the appropriate commands to the anchor SFA 412.

After the service flows have been established, the application function (AF) 420, located in the CSN 402, can request the H-AAA server 406 to setup an additional data flow with a particular QoS (Quality of Service) characteristic. For example, a SIP application server (not shown) could request a separate service flow for a VoIP session. The H-AAA server 406 will again send the appropriate commands to the anchor SFA function 412 in the ASN 404.

Additional details concerning the WiMAX network may be found in WiMAX NWG Stage 2, "WiMAX End-to-End Network System Architecture", December 2005.

The subscriber network access process in WiMAX network 400, which may employ EAP as its authentication framework, begins when the MS 418 sends a request to the Network Access Server (NAS) 416 in the ASN 404. The NAS forwards the request to the H-AAA server 404, which evaluates the request and returns an appropriate response to the ASN 404 if the subscriber is successfully authenticated. In response, the ASN 404 provisions the bearer plane and notifies the subscriber that it is ready using, in the case of EAP, an EAP-Success message. After successful authentication, the network provides the MS 418 with the radio channel that is to be used. The network 400 allocates the necessary radio resources and informs the MS 418 by sending a message such as the message DSC-Req (Dynamic Service Change Request).

Figure 5:
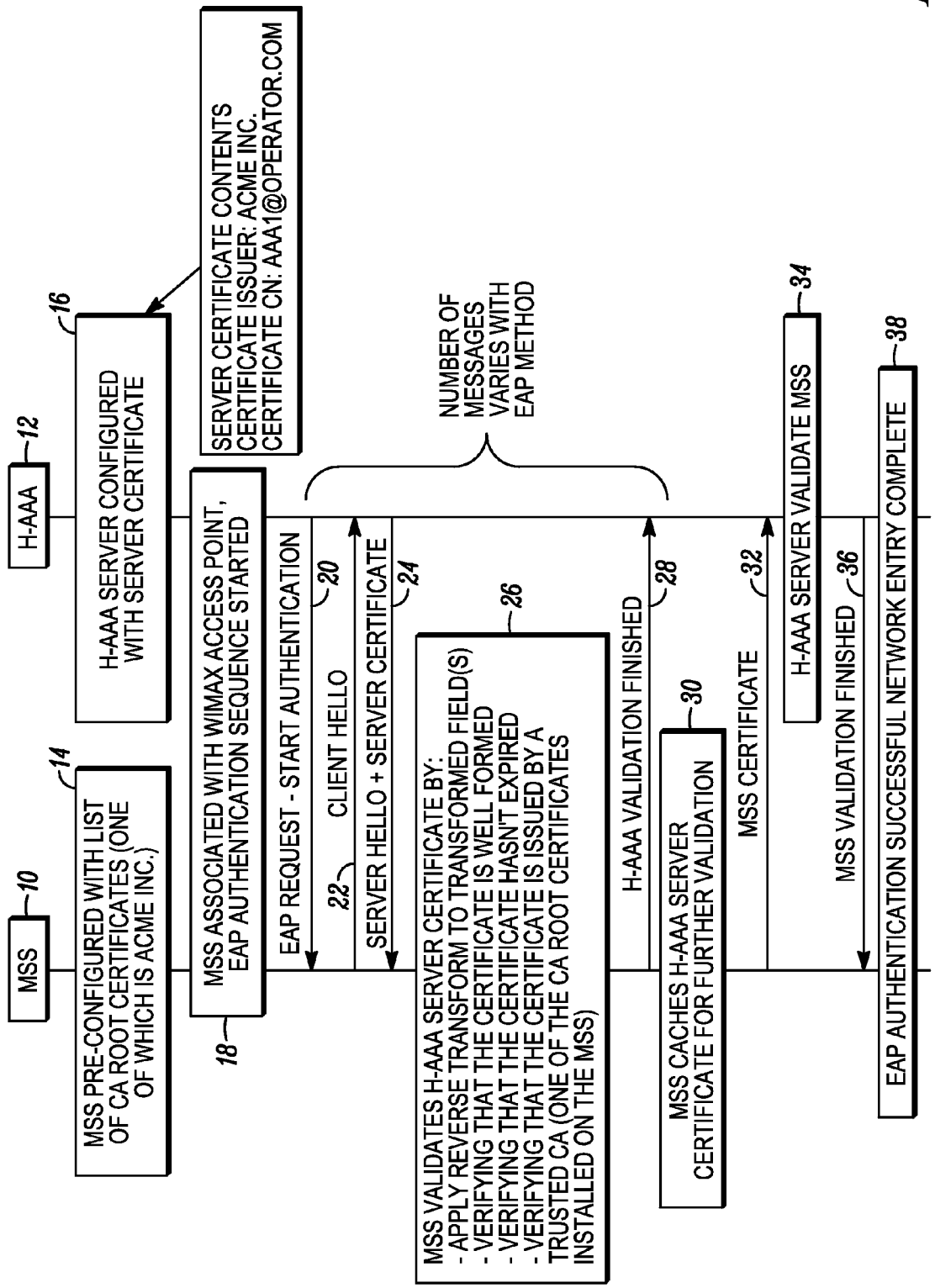
FIG. 5 illustrates one example of an EAP authentication protocol that may be used in connection with an network access process to authenticate a mobile subscriber station (MSS) who wishes to gain access to a WiMAX network.

FIG. 5 illustrates one example of an EAP authentication protocol that may be used in connection with the network access process discussed above to authenticate a mobile subscriber station (MSS) who wishes to gain access to a WiMAX network such as WiMAX network 100. An MSS 10 is pre-configured 14 with a list of Certificate Authority (CA) Root Certificates. These are trusted digital credentials identifying entities that have the authority to certify operation of the terminal on the network. The MSS 10 is also configured with a defined list of one or more regular expression based realms. For example, an MSS may be configured with a network realm filter such as *.carrier.com. Service on the network for the MSS is authenticated by a H-AAA server 12. This server is configured 16 with a Server Certificate issued by a carrier. One or more fields in the Server Certificate may be transformed to enhance the security of the network access process. As previously mentioned, while any certificate field or fields may be transformed, in some implementations it may be advantageous to transform an optional field or a field that is not well defined or fully specified by the appropriate standard such as X.509, such as some attributes in the distinguished name in an X.509 certificate.

Upon an initial communication 18 from MSS 10, the answering access point associated with the WiMAX network connects to the H-AAA server for authentication of the MSS 10. The access point only allows EAP packets between the MSS to the H-AAA 12, blocking all other data. H-AAA server 12 sends 20 an EAP request message to start a particular authentication method (EAP-TLS in this example) through the access point to the MSS 10. The MSS replies 22 through the access point with an EAP-TLS Client Hello message including its identity. The H-AAA server responds 24 with a Server Hello EAP-TLS packet containing the identity of the authentication server and its own Server Certificate. The above description has been simplified to exclude additional, non-pertinent information exchanged in the EAP protocols for the sake of brevity.

The MSS validates the H-AAA Server Certificate 26 by: a) applying a reverse transformation to any transformed field using the appropriate algorithm to obtain the original value such as a domain name or IP address of the H-AAA, b) verifying that the digital certificate is well formed, c) verifying that the digital certificate hasn't expired, and d) verifying that the digital certificate is issued by a trusted CA (i.e. one of the CA Root Certificates installed on the MSS). Assuming the H-AAA Server Certificate is valid (as shown), an EAP message is sent indicating that validation is finished 28. Optionally, the MSS can cache 30 the H-AAA Server Certificate for further validation.

As an alternative to step (a), an original transformation, may be repeated if the subject of the transformation is known to the MSS. For example, the transformation may be a digest function that is applied to the whole message excluding the signature where the result of the digest is then digitally signed to generate the certificate signature. Alternatively, the transformation may be applied to the public key in the certificate in order to generate the value of an attribute such as the common name inside the distinguished name. The MSS in this case repeats the transformation to verify that the result matches another field in the certificate according to the defined certificate profile.

Also optionally, the MSS may need to send 32 an EAP packet containing its own digital certificate to the H-AAA server. The MSS certificate may include one or more transformed fields in the digital certificate in the manner described above. In this way the H-AAA server validates 34 the digital certificate by a) applying a reverse transformation to any transformed field using the appropriate decryption algorithm to obtain the original value such as a MAC Address or IP address of the MS, b) verifying that the digital certificate is well formed, c) verifying that the digital certificate hasn't expired, and d) verifying that the digital certificate is issued by a trusted CA. Assuming the MS Certificate is valid, an EAP message is sent indicating that validation is finished 36.

As an alternative to step (a), an original transformation is repeated if the subject of the transformation is known to the H-AAA server. For example, the transformation may be a digest function that is applied to the whole message excluding the signature where the result of the digest is then digitally signed to generate the certificate signature. Alternatively, the transformation may be applied to the public key in the certificate in order to generate the value of an attribute such as the common name inside the distinguished name. The H-AAA server in this case repeats the transformation to verify that the result matches another field in the certificate according to the defined certificate profile.

Once the EAP authentication of the H-AAA server and, if necessary, the MS, is successfully completed, the access point is directed to authorize 38 the MSS for other types of traffic, making the network entry complete.

It should also be noted that there are many types of EAP protocols that can be used for authentication. Some example EAP protocols that utilize server AAA digital certificates include, but are not limited to: EAP-TLS (Transport Layer Security), EAP-TTLS (Tunneled Transport Layer Security), PEAP (Password Extensible Authentication Protocol), each of which defines how authentication takes place. Of course, as previously noted, the methods and techniques described herein may be used in connection with other authentication frameworks besides any of the aforementioned EAP protocols.

In the examples presented above methods and techniques have been provided for gaining access to a communications network in a manner that involves both security and authentication. More generally, however, these methods and techniques may be employed to establish a wide variety of different types of communication sessions with an authenticated endpoint over a communications network. For instance, a client device may wish to download content from a content server in which either or both the client device and the content server are authenticated. Additionally, the client device may establish a communication session with other endpoints such as a conditional access system and the like. Of course, as in the previous examples, one of the endpoints may be an H-AAA server associated with a communications network and the communications session may be established to gain access to the communications network.

Figure 6:
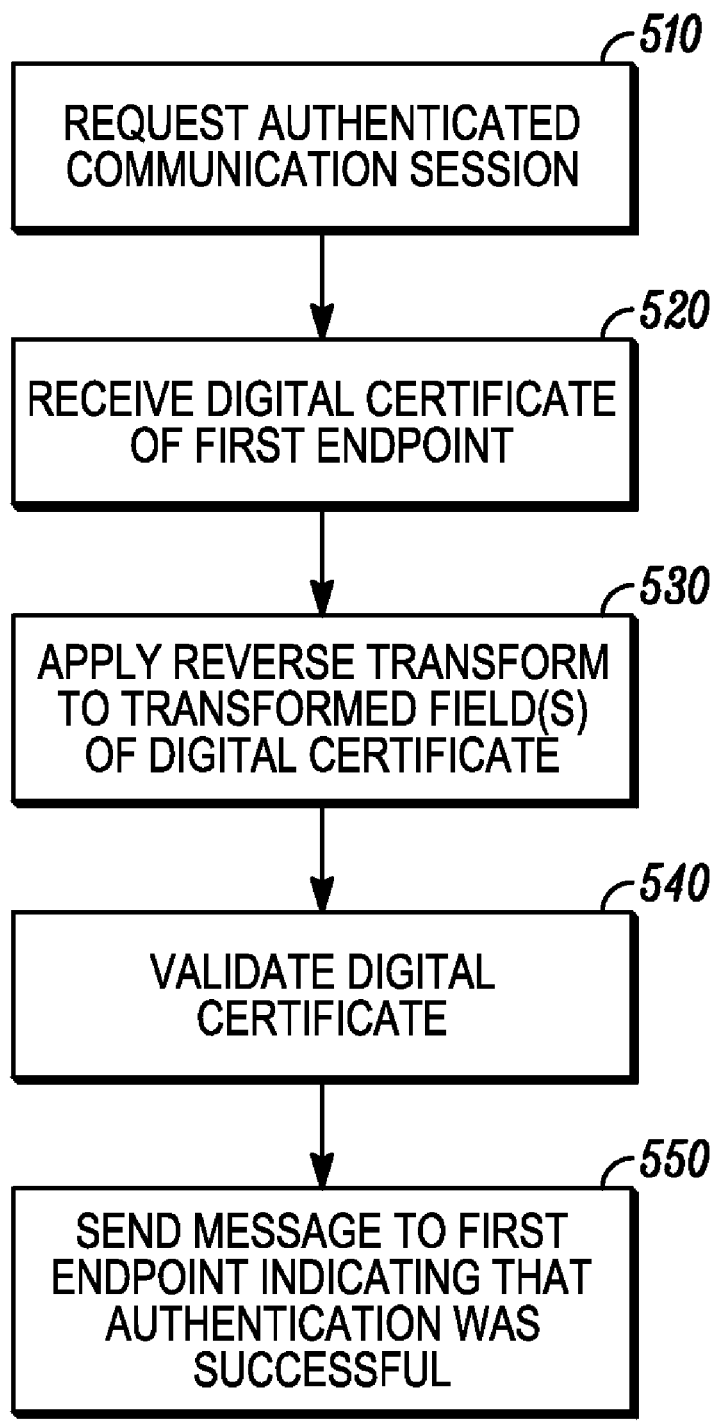
FIG. 6 is a flowchart showing one example of a method for establishing a wide variety of different types of communication sessions over a communications network with an authenticated endpoint.

FIG. 6 is a flowchart showing one example of a method for establishing a wide variety of different types of communication sessions over a communications network with an authenticated endpoint. The method begins in step 510 when an MSS or other client device sends a first message to a first end point over the communications network requesting an authenticated communication session with the first end point. The message includes the identity of the MSS requesting the authenticated communication session. In step 520, the MSS receives from the first endpoint a digital certificate issued by a certifying source verifying information contained in the digital certificate, including information identifying the first endpoint. The digital certificate includes a plurality of fields, one or more of which are transformed in accordance with a confidential proprietary transformation algorithm. The MSS applies the appropriate reverse transform to the transformed field(s) in step 530 and validates the digital certificate in step 540. The MSS sending a second message to the first endpoint in step 550 indicating that validation was successfully completed, thereby completing the establishment of the communication session.

The processes described above, including but not limited to those presented in connection with FIG. 6, may be implemented in general, multi-purpose or single purpose processors. Such a processor will execute instructions, either at the assembly, compiled or machine-level, to perform that process. Those instructions can be written by one of ordinary skill in the art following the description presented above and stored or transmitted on a computer readable medium. The instructions may also be created using source code or any other known computer-aided design tool. A computer readable medium may be any storage medium capable of carrying those instructions and include a CD-ROM, DVD, magnetic or other optical disc, tape or silicon memory (e.g., removable, non-removable, volatile or non-volatile).

The invention claimed is:

1. A method for enhancing security of a communication session between a client and a server which employ a key management protocol, comprising:
    sending, by the client, a first message to the server over a communications network requesting a secure communication session therewith, said message including an identity of the client requesting the authenticated communication session;
    receiving, by the client, from the server, over the communications network a digital certificate issued by a certifying source verifying information contained in the digital certificate, wherein said digital certificate includes a plurality of fields, one or more of said fields being transformed in accordance with a transformation algorithm;
    applying a reverse transform to the one or more transformed fields to obtain the one or more fields and validating the digital certificate; and
    sending, by the client, a second message to the server indicating that validation is complete.

2. The method of claim 1 wherein sending and receiving are performed in accordance with an Extensible Authentication Protocol (EAP).

3. The method of claim 1 wherein the digital certificate conforms to a pre-established standard.

4. The method of claim 3 wherein the pre-established standard is X.509.

5. The method of claim 3 wherein the one or more fields in the digital certificate that are transformed are not fully specified by the standard.

6. The method of claim 3 wherein the pre-established standard is X.509 and the one or more fields that are transformed are optional or not fully specified attribute fields in a distinguished name field.

7. The method of claim 1 further comprising receiving a public key from the server for use in accordance with a key management protocol and wherein the digital certificate verifies that the public key is associated with the server.

8. The method of claim 1 wherein the server is a content server and the communications session is established to receive content from the content server.

9. The method of claim 1 wherein the server is a conditional access system server.

10. The method of claim 1 wherein the server is a Home Authentication, Authorization, Accounting (H-AAA) server associated with the communications network and the communications session is established to gain access to the communications network.

11. The method of claim 1 wherein the transformation algorithm is a patented or otherwise proprietary transformation algorithm.

12. A method of providing a client device access to a communications network, comprising:
    receiving from the client device over the communications network a first message requesting access to network services, said message including an identity of the client device requesting access;
    sending to the client device over the communications network a digital certificate verifying credentials of an H-AAA server associated with the communications network, wherein said digital certificate includes a plurality of fields, one or more of said fields being encrypted in accordance with an encryption algorithm; and receiving a second message from the client device indicating that validation of the digital certificate is complete.

13. The method of claim 12 wherein the transformation algorithm is a patented or otherwise proprietary algorithm.

14. The method of claim 12 wherein the communications network is a wireless communications network.

15. The method of claim 14 wherein the wireless communications network is a WiMAX network.

16. A method of gaining access to a communications network, comprising:

sending, by a client device, a first message to an access point in the communications network requesting access to network services, said message including an identity of the client device requesting access;

receiving, by the client device from the access point, a digital certificate from a H-AAA server associated with the communications network, wherein said digital certificate including a plurality of fields, one or more of said fields being transformed in accordance with a transformation algorithm;

applying a reverse transformation to the one or more transformed fields and validating the H-AAA server certificate; and sending, by the client device, a second message to the access point indicating that validation is complete.

17. The method of claim 16 wherein sending and receiving are performed in accordance with an Extensible Authentication Protocol (EAP).

18. The method of claim 16 wherein the digital certificate conforms to a pre-established standard.

19. The method of claim 18 wherein the pre-established standard is X.509.

20. The method of claim 18 wherein the one or more fields in the digital certificate that are transformed are not fully specified by the standard.

21. The method of claim 18 wherein the pre-established standard is X.509 and the one or more fields that are transformed are optional or not fully specified attribute fields in a distinguished name field.

22. The method of claim 16 further comprising receiving a public key from the H-AAA server for use in accordance with a key management protocol and wherein the H-AAA server certificate verifies that the public key is associated with the H-AAA server.

* * * * *